Aug. 27, 1940.   H. SCHNEIDER   2,212,901
TRANSMISSION
Original Filed Nov. 26, 1934   4 Sheets-Sheet 2

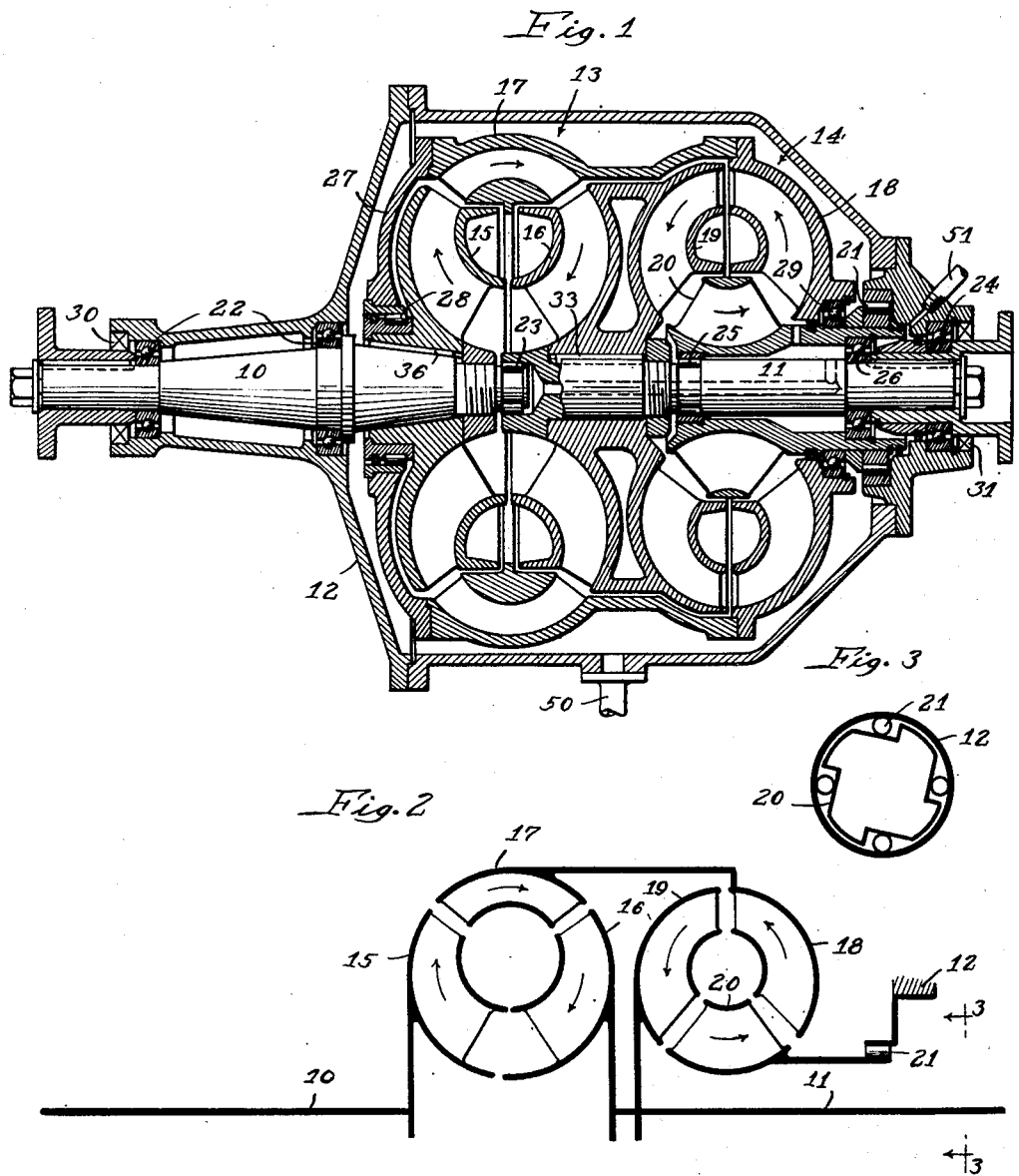

Inventor:
Heinrich Schneider

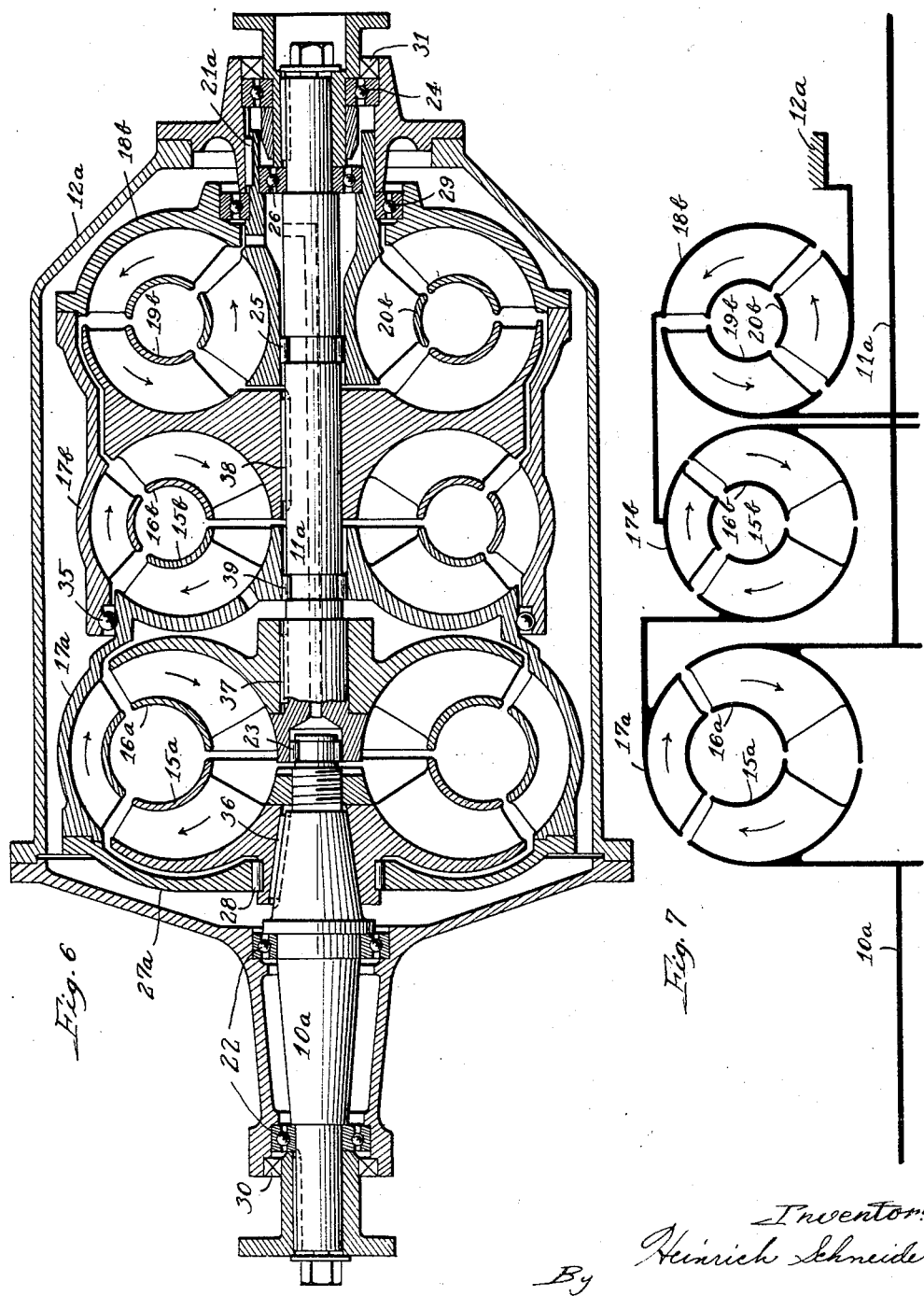

Aug. 27, 1940. H. SCHNEIDER 2,212,901
TRANSMISSION
Original Filed Nov. 26, 1934  4 Sheets-Sheet 4
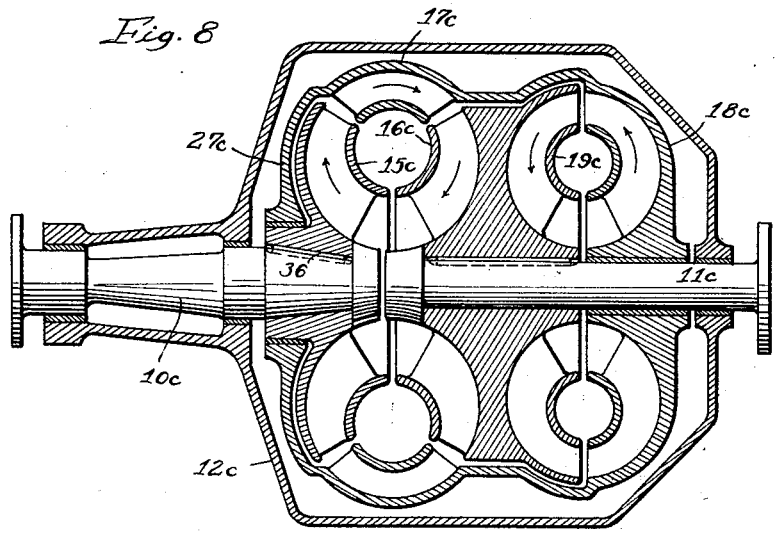
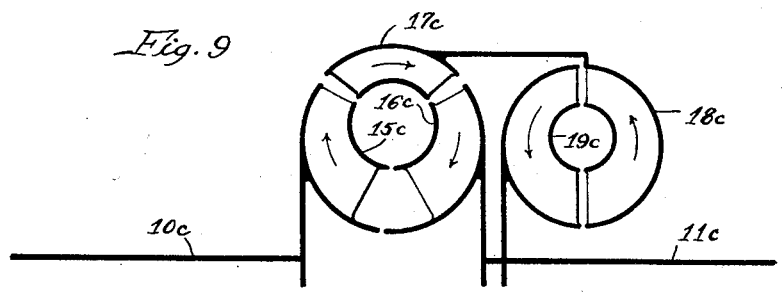
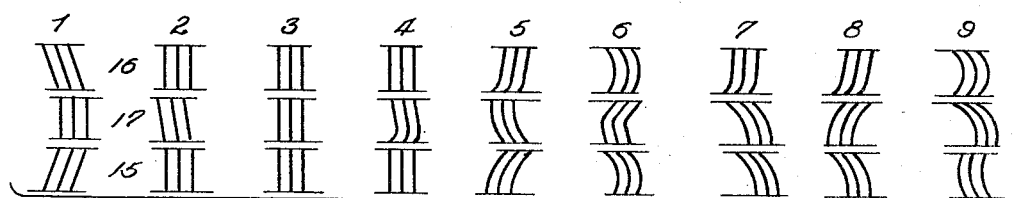
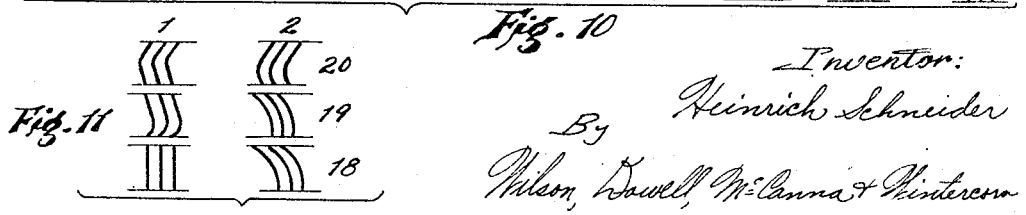

Patented Aug. 27, 1940

2,212,901

UNITED STATES PATENT OFFICE 2,212,901

TRANSMISSION

Heinrich Schneider, Beloit, Wis., assignor to Schneider Brothers Corporation, Wilmington, Del., a corporation of Delaware Application November 26, 1934, Serial No. 754,739
Renewed January 26, 1940

34 Claims. (Cl. 60—54)

This invention relates to hydraulic transmissions of the Föttinger turbine type, and more particularly differential transmissions of that type.

Hydraulic couplings and hydraulic torque converters have been proposed and used in place of step-gear transmissions and electric drives particularly in automobiles and rail vehicles driven by internal combustion engines. An ideal drive for such vehicles must provide automatic continuous speed and torque variation over a wide range with high efficiency. However, hydraulic couplings give speed variation but no torque increase, and the torque converters offer speed variation and limited torque increase but at the cost of efficiency. It is, therefore, the principal object of my invention to provide differential types of hydraulic transmissions of the Föttinger turbine ring type to avoid the objections mentioned and fulfill the requirements of an ideal drive.

A differential transmission consists of a primary and a secondary drive which in combination transmit the total power from the driving shaft to the driven shaft, whereby the amount of power transmitted by each of the drives may vary from zero to full power, or vice versa, the sum of the two being always equal to the full power transmitted. Hitherto the differential type transmission has been available only with the crank and piston types of pump and motor mechanisms but the practical disadvantages of that type of mechanism as compared with the advantages of the Föttinger turbine type are generally known. In accordance with the present invention, therefore, hydraulic torque converters and hydraulic couplings of the Föttinger turbine ring type are combined to provide the primary and secondary drive in differential transmissions, the primary drive serving to transmit torque from the driving shaft substantially directly to the driven shaft and the secondary drive serving to transmit power indirectly to the driven shaft. The differential characteristic of the various forms of transmissions herein disclosed arises out of the fact that in each case one power transmitting element is a floating rotor not connected to the driving or driven shafts but free to to run at differential speeds determined solely by the movement of the fluid medium, and this floating element therefore acts as a torque and speed control and as the equalizing member of the transmission.

The invention is illustrated in the accompanying drawings, in which—

Figure 1 is a longitudinal section through a transmission made in accordance with my invention;

Fig. 2 is a diagram of that much of the transmission as occurs on one side of the center line;

Fig. 3 is another diagrammatic view of the one-way engaging brake taken on the line 3—3 of Fig. 2;

Fig. 6 is a longitudinal section through another transmission involving an extension of the principle of Fig. 1;

Fig. 7 is a diagram of that much of the transmission of Fig. 6 as occurs on one side of the center line;

Figure 4:
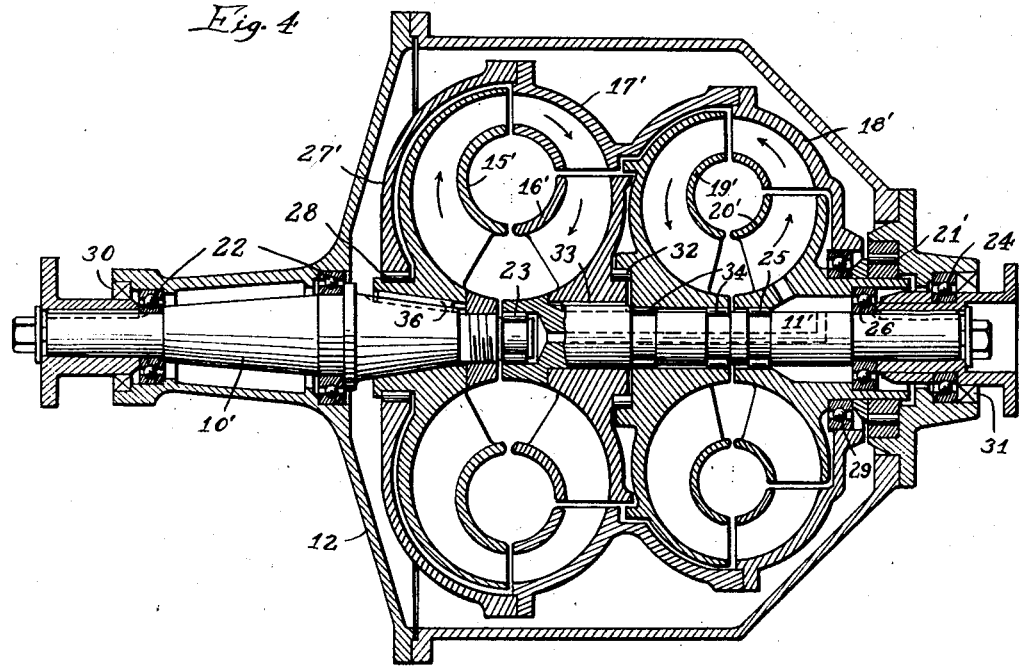
Figs. 4 and 5 are views similar to Figs. 1 and 2 showing a modified or alternative construction.

Fig. 8 is a longitudinal section through still another transmission of a more simplified form, of which Fig. 9 is a diagram related to Fig. 8 in the same way as the other diagrams are related to their construction views, and Figs. 10 and 11 are diagrams showing various combinations of blade curvatures that may be employed in my transmission, Fig. 10 showing the blades of the primary drive, and Fig. 11 the blades of the secondary drive, as, for example, in a transmission similar to Fig. 1.

Similar reference numerals are applied to corresponding parts throughout the views.

Referring first to Figs. 1-3, the driving and driven shafts are designated 10 and 11, respectively, and extend into and out of the opposite ends of a housing 12 for connection of the driving shaft 10 with an internal combustion engine, for example, and connection of the driven shaft 11 with a propeller shaft, for example, assuming the transmission is installed in a motor vehicle. The numeral 13 indicates the primary drive generally and 14 indicates the secondary drive generally of my differential type hydraulic transmission. The primary drive 13 amounts to a turbine coupling since it comprises a pump impeller 15 turning with the driving shaft 10 by reason of the key 36, and a turbine wheel 16 keyed as at 33 to turn with the driven shaft 11. However, the primary drive has, in addition to such parts of the usual hydraulic coupling a second turbine wheel 17 to drive the pump impeller 18 of the secondary drive. The secondary drive is a turbine torque converter and comprises, in addition to the pump impeller 18, driven as just stated by a part of the primary drive, a turbine wheel 19 mounted with the turbine wheel 16 on the driven shaft 11, and a reaction member 20 surrounding the driven shaft 11 and arranged to turn with respect to the housing 12 or be locked stationary therewith in the functioning of a one-way engaging brake 21. Now, it will be observed that the driving shaft 10 is supported in one end of the housing 12 in suitable ball bearings 22, and the driven shaft 11 is supported at one end on the adjacent end of the driving shaft 10 by a suitable roller or needle bearing 23 and at its other end in ball bearings 24 in the housing 12. A roller or needle bearing 25 and a ball bearing 26 provided between the reaction member 20 and the driven shaft 11 provide for easy turning of one with respect to the other. The turbine wheel 17 and pump impeller 18, along with an end plate 27 that is suitably secured to the turbine wheel 17, form a power transmitting element which I shall hereinafter refer to as a floating rotor inasmuch as it is not connected to the driving or driven shafts but is supported at one end on a roller or needle bearing 28 to turn freely with respect to the driving shaft 10 and pump impeller 15, and is similarly supported at its other end in a ball bearing 29 to run likewise freely with respect to the driven shaft 11 and reaction member 20. The floating rotor formed by these three elements 17, 18 and 27, constitutes an inner housing or enclosure for the rest of the working parts of the transmission, and is filled with oil or whatever working fluid is employed. The housing is sealed by packing glands at its opposite ends, as indicated at 30 and 31. The pipe 50 shown extending from the bottom of the housing conducts any oil leaking from the turbine wheels to a pump (not shown) which serves to return the oil through the pipe 51 to said wheels, to keep the transmission filled. The longitudinal passage in the shaft 11 establishes communication between the primary and secondary portions of the transmission to facilitate filling.

In operation, assuming that the driven shaft 11 is at a standstill and that the driving shaft 10 is being turned with increasing speed and with substantially constant torque, the pump impeller 15 under these circumstances, turning as it does with the driving shaft 10, pumps fluid to the first turbine wheel 17 which is coupled with the pump impeller 18 of the secondary drive. The floating rotor 17—18 is therefore rotating relative to the driven shaft 11. The fluid leaving the first turbine wheel 17 impinges on the second turbine wheel 16 and thus exerts a torque on the driven shaft 11 tending to rotate the same, if the resistance to turning is not too great. Now, the pump impeller 18 of the secondary drive is at the same time pumping fluid to the turbine wheel 19 of that drive so that an additional torque is exerted on the driven shaft. This additional torque is increased appreciably as a result of the functioning of the reaction member 20, the latter, together with the other members 18 and 19 of the secondary drive, forming a torque converter. When the speed of the driving shaft 10 is increased to such an extent that the sum of the torques exerted by the two turbine wheels 16 and 19 on the driven shaft 11 is sufficient to overcome the resistance to turning of said shaft, the driven shaft will, of course, begin to turn and gradually increase its speed. The present transmission affords very gradual power take-up without resorting to variation in the amount of working fluid employed, and, of course, the construction is thereby kept free of the mechanical complications which fluid control would necessitate. The fact that the floating rotor is not connected to the driving or driven shaft but turns at a self-adjusted speed in the fluid of the primary and secondary drives, is the thing that makes the differential transmission of power, just described, possible—the floating rotor acts as a torque and speed control and as the equalizing member of the transmission. Thus, for example, when the speed of the driven shaft approaches the speed of the driving shaft, the turbine wheel 17 transmits minimum power to the pump impeller 18; under such circumstances, practically the entire power transmitted is transmitted by the primary drive acting as a hydraulic coupling. The floating rotor 17—18 under those circumstances simply floats in the primary fluid stream at a speed close to that of the driving and driven shafts and there is very little fluid circulation taking place in the secondary drive, particularly when the impeller 18 and turbine wheel 19 are of substantially equal proportions. Naturally, under those conditions, it is desirable to have the reaction member 20 turn freely with the other parts of the secondary drive so as not to offer any resistance to their turning, and that is why a one-way engaging brake is provided at 21; it is only when the secondary drive is functioning that the reaction member 20 is held by the brake 21 against turning. Now, on the other hand, when there is a considerable difference in speed between the driving and driven shafts, a greater part of the power is transmitted through the secondary drive by reason of the spinning of the floating rotor relative to the driven shaft—at some speed between or above the speeds of the driving and driven shafts. In other words, as the resistance of the driven shaft changes, the torque and speed of the secondary drive changes automatically. The secondary drive gives a torque increase varying with the varying torque and speed conditions of the engine and load, and it furthermore provides an easy acting clutch that is self-releasing at low engine speeds. The size and capacity of the secondary drive will be predetermined in relation to the size and capacity of the primary drive, so that the efficiency of the transmission is high over a wide speed and torque range, and particularly over the range most used in the special application for which the transmission is intended. The form of the blades or vanes of the parts 15—17 and 18—20 will be determined according to the speed and torque range to be obtained. While the blades of the parts 18—20 may be similar to what are used in conventional torque converters, the blades of parts 15—17 may be straight as in ordinary couplings, or may be in combinations of straight and curved blades, depending upon the performance to be obtained. See Figs. 10 and 11. The advantages of the present transmission should be clear from the foregoing. In an ordinary hydraulic coupling drive where the internal combustion engine drives the primary shaft of the coupling, the maximum speed of the engine is limited by the torque of the driven shaft, and the engine cannot be speeded up to develop full power when the vehicle is at a standstill or during the acceleration period. With the present transmission, on the other hand, the engine can be speeded up even when the driven shaft is stationary, because the floating rotor gives way and rotates at high speed to transmit engine power to the secondary drive where it is converted into torque applied to the driven shaft. The higher the speed of the engine under this stationary shaft condition, the higher the speed of the floating rotor and the greater the power transmitted thereby. Therefore, by suitably proportioning the floating rotor, its reaction to changes in the speed of the engine can be made of greater or less value, and by further suitable relative proportioning of the other parts, the maximum torque exerted on the driven shaft for a given engine torque can be varied as desired, or the high efficiency range of the transmission shifted toward the desired speed and torque range of the specific application for which the transmission is intended.

The directions of fluid circulation indicated in Figs. 1 and 2 are explained as follows: Assuming the impeller 15 is turning at a higher speed than the turbine wheel 16, the difference in the centrifugal force acting on the oil or other fluid used will result in circulation in the direction indicated, out through the passages in the impeller 15 and rearwardly through the passages in the turbine wheel 16. Then too, since the impeller 18 will turn at a higher speed than the turbine wheel 19, the difference in the centrifugal force acting on the oil in the secondary drive will result in circulation in the direction indicated. The kinetic energy of the circulating oil transmits power in each case from the impeller to the turbine. The total torque transmitted to the driven shaft is in any case the sum of the torques transmitted to the turbine wheels 16 and 19 by the primary and secondary drives, respectively.

Figure 5:
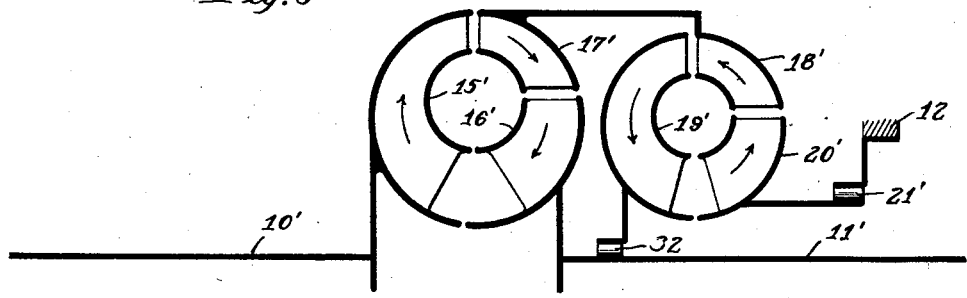

Referring to Figs. 4 and 5, the driving shaft is 10' and the driven shaft is 11'. 15' is the pump impeller of the primary drive, and 16' and 17' are its associated turbine wheels. The wheel 17', together with the end plate 27' and the impeller 18' of the secondary drive, form the floating rotor of this transmission. The principal difference in the construction of Fig. 4 as compared with Fig. 1 lies in the fact that the turbine wheels 16' and 19' of the primary and secondary drives, respectively, are not cast integral but are separate and arranged merely to be interconnected by an overrunning clutch 32 to turn together so long as the turbine wheel 19' does not tend to lag with respect to the turbine wheel 16'. In other words, with this combination the turbine wheel 19' can transmit torque to the driven shaft 11' but the shaft cannot drive the turbine wheel. There is, therefore, no danger whatever of any power loss in the secondary drive. The turbine wheel 16' alone is keyed to the driven shaft 11', as at 33, the turbine wheel 19' being mounted on roller or needle bearings 34 to permit free relative rotation between the shaft and wheel. The reaction member 20' of the secondary drive cooperates with the pump impeller 18' and turbine wheel 19' similarly as in the previous forms; when the reaction of the member 20' is in the opposite direction with respect to the rotation of the impeller 18' and turbine wheel 19', the one-way engaging brake 21' holds the reaction member stationary, but this brake will disengage the moment the reaction member tends to rotate in the same direction as the associated parts of the secondary drive. This transmission is otherwise like the one previously described except for a difference in the proportioning of the impeller and turbine parts. The object in changing proportions of these parts was mentioned in the previous discussion.

Figs. 6 and 7 illustrate a transmission which involves an extension of the principle of the transmissions of Figs. 1 and 4 to meet the requirements of drives in which large torque variations are desired. While this transmission involves a differential combination of three turbine ring or turbo-ring drives providing primary, secondary, and tertiary drives, it should be understood that the principle might be extended even further. In these transmissions where three or more turbine ring structures are employed, the floating turbine wheel of a preceding turbine ring structure is coupled with the pump impeller of the next turbine ring structure, as clearly shown. The pump impellers 15a and 15b correspond to the impeller 15 of Fig. 1. In like manner, the turbine wheels 16a, 16b, 17a, and 17b correspond to the turbine wheels 16 and 17 of Fig. 1. In other words, the primary and secondary drives of Fig. 6 amount to a duplication of the primary drive of Fig. 1, thus providing two floating rotors where one occurs in Fig. 1, one rotor consisting of the turbine wheel 17a and impeller 15b together with the end plate 27a, and the other rotor consisting of the turbine wheel 17b and impeller 18b. A ball bearing 35 is provided between the rotors to allow free rotation of one relative to the other and maintain the same in true concentric relation. The tertiary drive of Fig. 6 corresponds to the secondary drive of Fig. 1, the impeller 18b corresponding to impeller 18, the turbine wheel 19b corresponding to the turbine wheel 19, and the reaction member 20b corresponding to the reaction member 20, except that there is no one-way engaging brake like the brake 21, shown in that form, but instead, a key 21a locking the reaction member to the housing 12a. The driving shaft 10a has only the impeller 15a of the primary drive keyed thereon, as indicated at 36, whereas the driven shaft 11a has turbine wheels 16a, 16b, and 19b keyed thereon, as indicated at 37 and 38. In view of the fact that the first rotor 17a—15b provides a bearing at 35 for the second rotor 17b—18b, an additional bearing is required for the first rotor at 39 for support thereof on the driven shaft 11a.

In operation, assuming an internal combustion engine, not shown, is connected to the shaft 10a, a speed reduction torque increasing drive is obtained. To begin with, the floating rotors 17a—15b and 17b—18b rotate rapidly with respect to the stationary or slowly rotating turbine wheels 16a, 16b, and 19b in the speeding up of the engine. Most of the power from the pump impeller 15a is transmitted to the impeller 15b of the secondary drive and from that to the impeller 18b of the tertiary drive by reason of the fact that the floating rotors of the primary and secondary drives are not mechanically connected with the driving or driven shafts and rotate freely. Appreciable torque is exerted on the driven shaft 11a by the turbine wheel 19b due to the torque converter action in the tertiary drive. A certain amount of torque is added by the turbine wheels 16a and 16b of the primary and secondary drives, and is, of course, transmitted directly to the driven shaft 11a. When the torque exerted is sufficient to overcome the resistance to turning of the shaft 11a, the shaft will, of course, commence to turn and gain speed. The two floating rotors adjust themselves in speed as the driven shaft picks up speed, and thus provide a completely automatic control and afford an extremely elastic and smooth drive. The rotors adjust themselves in speed at any transmission ratio to obtain the most favorable hydraulic circulation with the associated impellers and turbine wheels so that the smallest losses occur under each condition. By varying the profile diameters of the different drives and changing the turbine wheel diameters in proper relationship to one another, large increases in torque can be obtained over selected ranges of speeds. When the driven shaft approaches the speed of the driving shaft, under which conditions the floating rotors are, of course, turning at nearly the same speed as the driving and driven shafts, an efficiency is secured about as high as that obtained with the conventional fluid flywheel. At lower speeds, larger torque increases are obtained than with the conventional torque converter drive, because of the additional torque afforded by the primary and secondary drives, or whatever additional drives are provided. Then too, whereas in a fluid flywheel drive the maximum speed of the driving shaft is limited by the torque of the driven shaft, so that the engine cannot be speeded up to develop full power, or nearly full power, the present transmission permits speeding up of the engine even when the driven shaft is at a standstill, because the floating rotors can yield and turn at high speeds to transmit power to the secondary and tertiary drives, thereby causing a large torque increase. The higher the speed of the engine, the higher the speed and power of the floating rotors, and it follows that by suitable dimensioning of the pump impellers in the secondary and tertiary drives, the reaction of the floating rotors to the engine can be made large or small, and by further suitable dimensioning of the pump impeller of the primary drive and the turbines in the secondary and tertiary drives, the maximum torque obtainable can be increased or decreased as desired, or the maximum efficiency range of the transmission shifted into the desired speed and torque range to suit the requirements of the particular application for which the transmission is intended.

Assuming on the other hand that the internal combustion engine is connected with the shaft 11a to transmit drive to the shaft 10a, the turbine wheels 19b, 16b, and 16a will act as pump impellers, and the member 20b as a reaction member and the rest of the members as turbine wheels, so that a speed increasing drive is secured instead of the speed reduction, torque increasing drive previously described. It follows, therefore, that when the present transmission is used, for example, in an automobile, the speed increasing characteristic just described would be taken advantage of in braking.

The transmission of Fig. 8 is similar to that of Fig. 1 in so far as the provision of a floating rotor is concerned, but in this transmission the secondary drive is in the form of a hydraulic or turbine coupling instead of a torque converter. A transmission of this kind is suitable for drives in which no torque increase is required. The primary drive consists of a pump impeller 15c on the driving shaft 10c, a turbine wheel 16c keyed to the driven shaft 11c, and a turbine wheel 17c forming a portion of a floating rotor. One end of the rotor is formed by an end wall 27c and the other end by a pump impeller 18c. The latter is one-half of the coupling constituting the secondary drive, the other half being the turbine wheel 19c formed preferably integral with the turbine wheel 16c as shown. There is no reaction member in this transmission. The housing 12c encloses the structure just described.

In operation, this transmission functions differently from the ordinary fluid or hydraulic coupling, or so-called fluid flywheel, in that the torque transmitted to the driven shaft 11c increases less rapidly with increasing slippage between the coupling parts, a characteristic which makes the transmission highly desirable in many applications such, for example, as automobile drives. When the engine driving the shaft 10c speeds up, the floating rotor 17c—18c gives way and speeds up to such an extent as to divide the total slippage between the primary and secondary drives, particularly when the impeller 18c is of relatively small capacity.

It is believed the foregoing description conveys a good understanding of the objects and advantages of my invention. The floating rotor which is responsible for the differential drive in the transmissions of my invention and acts as a torque and speed control and equalizing member is, it should be understood, both a power-receiving or turbine element, and a power-delivering or pump element, regardless of the type of transmission in which it is employed. The shaft referred to as the "driving shaft" in each transmission may, it should also be understood, become the driven shaft, and vice versa; the transmissions are operative either way, and can, of course, be used as speed reduction, torque increasing drives or speed increasing, torque reducing drives. The appended claims have been drawn so as to cover all legitimate modifications and adaptations.

I claim:

1. A transmission comprising in combination with driving and driven elements a primary turbo-ring drive comprising a fluid impeller turning with the driving element, a first turbine wheel turning with the other of said elements, and a second turbine wheel independent of said driving and driven elements, together with a secondary turbo-ring drive comprising a fluid impeller independent of the driving and driven elements and turning with the second turbine wheel, and a driven element driven by at least one turbine part of each turbo-ring drive.

2. A transmission comprising a first and second turbo-ring drive, each having rotary impeller and turbine parts, one of said drives having a plurality of turbine parts one of which provides a mechanical driving connection with an impeller part of the other turbo-ring drive, a driving element turning the fluid impeller of the one turbo-ring drive, and a driven element driven by the other turbine parts of the two turbo-ring drives.

3. In a transmission comprising two turbo-ring drives having rotary impeller and turbine parts, the first turbo-ring drive having two turbine parts, one of which is freely rotatable, a driving member driving the impeller part of the first turbo-ring drive, and a driven member driven by the other turbine part of the first turbo-ring drive and a turbine part of the second turbo-ring drive; a rotor free of any mechanical connection with the driving and driven members and serving to connect for joint rotation the impeller of the second turbo-ring drive and the freely rotatable turbine part of the first turbo-ring drive.

4. In a differential hydraulic transmission, the combination with driving and driven members of two Föttinger type fluid couplings, one coupling having an impeller turned by the driving member, and both couplings having turbine parts transmitting torque directly to the driven member, and a freely rotatable rotor comprising an additional turbine part actuated by the fluid stream of the first coupling and an impeller arranged to circulate the fluid of the second coupling.

5. A transmission comprising in combination with driving and driving elements a primary drive vortex ring type fluid coupling comprising a fluid impeller turning with the driving element, a first turbine wheel turning with the other of said elements, and a second turbine wheel independent of said driving and driven elements, together with a secondary drive vortex ring type torque converter, comprising a fluid impeller independent of the driving and driven elements and turning with the second turbine wheel, another turbine wheel arranged to turn with the first turbine wheel, and a relatively stationary reaction member in fluid circulating relation to the impeller and turbine wheel of said torque converter.

6. A transmission as set forth in claim 5 including an overrunning or freewheeling clutch providing a one-way driving connection between the torque converter turbine wheel and the first turbine wheel, whereby the first turbine wheel is free to turn faster than the torque converter turbine wheel.

7. A transmission as set forth in claim 5, wherein the transmission includes a relatively stationary support and a one-way engaging brake between said support and said reaction member to hold the latter against turning in the direction opposite to the rotation of the associated impeller and turbine wheel, but arranged to allow rotation in the same direction.

8. A transmission comprising a vortex ring type fluid coupling and a similar type torque converter, said coupling and converter having impellers and turbine wheels, the fluid coupling having two turbine wheels, and said torque converter also having a reaction member, means providing a driving connection between a turbine wheel of the coupling and an impeller of the torque converter independent of the driving and driven elements, a driving element turning the fluid impeller of the coupling, and a driven element driven by the other turbine wheels of the coupling and converter.

9. A transmission as set forth in claim 8 including a housing, and means for holding the reaction member of the converter against turning backward relative to the housing, but arranged to allow free forward rotation.

10. In a transmission comprising a vortex ring type fluid coupling and a similar type torque converter, said coupling and converter having rotary impeller and turbine parts, said coupling having two turbine parts, one of which is freely rotatable, a driving member driving the impeller part of the coupling, and a driven member driven by turbine parts of the coupling and converter, a rotor free of any connection with the driving and driven members and serving to connect for joint rotation the impeller of the converter and the freely rotatable turbine part of the coupling.

11. In a differential hydraulic transmission, the combination with driving and driven members, of a Föttinger type fluid coupling and a Fottinger type torque converter, the coupling having an impeller turned by the driving member, the coupling and converter having turbine parts transmitting torque to the driven member, the converter also having a reaction member, and a freely rotatable rotor comprising a turbine part actuated by the fluid stream of the coupling and an impeller arranged to circulate the fluid of the converter.

12. A transmission as set forth in claim 11 including a housing, and means for holding the reaction member of the converter against turning backward relative to the housing, but arranged to allow free forward rotation.

13. In a fluid transmission, the combination of a Föttinger type coupling comprising an impeller driven by a driving element, and a primary turbine wheel driving a driven element, the coupling including an auxiliary turbine wheel completing a fluid circuit between the impeller and turbine wheel, together with a Föttinger type torque converter comprising an impeller driven by the auxiliary turbine wheel, a secondary turbine wheel arranged to transmit additional torque to the driven element, and a reaction member with respect to which said last mentioned impeller and turbine wheel are arranged to turn.

14. A transmission as set forth in claim 13 including a housing, and means for holding the reaction member of the converter against turning backward relative to the housing, but arranged to allow free forward rotation.

15. A transmission as set forth in claim 13 including means between the primary and secondary turbine wheels whereby the secondary wheel is arranged to transmit drive forwardly to the primary wheel, but the primary wheel is free to turn forwardly relative to the secondary wheel.

16. In a differential hydraulic transmission, the combination with driving and driven members, of a plurality of Föttinger type fluid couplings and a Föttinger type torque converter, the first coupling having an impeller turned by the driving member, the couplings and converter having turbine parts transmitting torque to the driven member, and freely rotatable rotors the first of which comprises a turbine actuated by the fluid stream of the first coupling and an impeller arranged to circulate fluid in the next coupling, and the last of which comprises a turbine actuated by the fluid stream of the last coupling and an impeller arranged to circulate the fluid of the converter.

17. In a hydraulic transmission, simultaneously coacting turbo-ring drives interposed between driving and driven elements, the driven element having drive transmitted directly thereto by a turbine wheel in each of said turbo-ring drives, and means actuated by the fluid streams of said drives and rotatable independently of the driving and driven elements causing fluid movement in a related drive or drives so as to interconnect the turbo-ring drives for simultaneous differential operation.

18. In a hydraulic transmission, simultaneously coacting turbo-ring drives interposed between driving and driven elements, the driven element having drive transmitted directly thereto by a turbine wheel in each of said turbo-ring drives, and a floating rotor independent of mechanical connection with the driving and driven elements and adapted to turn independently of the driving and driven elements, said rotor providing a fluid actuated connection between said drives, whereby fluid movement is one drive causes fluid movement in a related drive to provide for differential transmission of power between the driving and driven elements.

19. In a hydraulic transmission, two or more simultaneously coacting turbo-ring drives interposed between driving and driven elements, the driven element having drive transmitted directly thereto by a turbine wheel in each of said turbo-ring drives, and rotors independent of any mechanical connection with the driving and driven elements and adapted to turn independently of the driving and driven elements, said rotors providing fluid actuated connections between said drives whereby fluid movement in one drive causes fluid movement in related drives to provide for differential transmission of power between the driving and driven elements, each of said rotors comprising a pump impeller element in one of said drives and a turbine element in another drive.

20. In a hydraulic transmission, simultaneously coacting turbo-ring drives interposed between driving and driven elements and adapted to be interconnected so as to differentially couple said driving and driven elements, one of said drives including two turbine elements, and the other drive including a reaction member whereby said drive operates as a torque converter, the latter drive further including an impeller connected to turn with one of the two turbine elements of the first drive to obtain differential drive.

21. A hydraulic transmission comprising a plurality of turbo-ring drives cooperating to transmit power from a driving to a driven shaft, one of said drives comprising more than two power transmitting rotatable members rotatable independently of each other, one being connected to the driving shaft, another being connected to the driven shaft, and another being fluid actuated to transmit power differentially through another one of the turbo-ring drives to the driven shaft.

22. A hydraulic transmission comprising a plurality of turbo-ring drives cooperating to transmit power from a driving to a driven shaft, one of said turbo-ring drives comprising an impeller part connected to the driving shaft and a plurality of turbine parts, one of which is connected to the driven shaft and another of which is fluid actuated to transmit power differentially through another one of the turbo-ring drives to the driven shaft.

23. A hydraulic transmission comprising a vortex ring type coupling having an impeller part arranged to turn with a driving member and a plurality of turbine parts operatively associated with the impeller part, one of the turbine parts being freely rotatable and another being arranged to turn with a driven member, and a vortex ring type torque converter comprising an impeller part, a turbine part and a reaction member, the turbine portion of said converter being arranged to turn with the driven member, and the impeller portion of said converter being arranged to turn with the freely rotating turbine part of the coupling.

24. In a hydraulic transmission, the combination of a driving member, a driven member, a single vortex ring type impeller turning with the driving member, a plurality of vortex ring type turbine wheels turning with the driven member, one of the last-mentioned turbine wheels being directly operatively associated with the impeller, a freely rotatable turbine wheel independent of the driving and driven members but operatively associated directly with the impeller and last-mentioned turbine wheel, a freely rotatable impeller independent of the driving and driven members and operatively associated with another of the first-mentioned turbine wheels, a reaction member operatively associated with the freely rotatable impeller and its associated turbine wheel, and means interconnecting the freely rotatable turbine wheel and the freely rotatable impeller.

25. A hydraulic transmission comprising, in combination, two three-part vortex ring type drives, one of the three parts of the one drive constituting an impeller, a driving member operating the same, one of the three parts of the other drive constituting a reaction member, one of the remaining parts of the first drive being interconnected with one of the remaining parts of the second drive for rotation relative to the associated parts of said drives, the third part of the first drive being arranged to turn with the third part of the second drive, and a driven member arranged to turn with the last-mentioned parts.

26. In a hydraulic transmission, two or more simultaneously coacting turbo-ring drives interposed between driving and driven elements, the driven element having drive transmitted directly thereto by a turbine wheel in each of said turbo-ring drives, and one or more rotors independent of any mechanical connection with the driving and driven elements, said rotors providing fluid actuated connections between said drives whereby the fluid circulation in one drive causes fluid circulation in another to provide for differential transmission of power between the driving and driven elements, one of said drives including a reaction member whereby said drive operates as a torque converter.

27. In a hydraulic transmission, two or more simultaneously coacting turbo-ring drives interposed between driving and driven elements, the driven element having drive transmitted directly thereto by a turbine wheel in each of said turbo-ring drives, and one or more rotors independent of any mechanical connection with the driving and driven elements, said rotors providing fluid actuated connections between said drives whereby the fluid circulation in one drive causes fluid circulation in another to provide for differential transmission of power between the driving and driven elements, each of said rotors comprising a pump impeller element in one of said drives and a turbine element in another drive, one of said drives including a reaction member whereby said drive operates as a torque converter.

28. A transmission for transmitting power from a driving member differentially to a driven member with varying speed and torque, comprising a primary and a secondary drive, the primary drive comprising a differential action hydraulic drive mechanism operable to transmit a portion of the power introduced by the driving member directly to the driven member and having a fluid actuated rotary part for transmitting the balance of the power by means of the secondary drive indirectly to the driven member, the secondary drive comprising a turbo-ring drive mechanism consisting of a pump impeller driven by the fluid actuated rotary part of the first mechanism and arranged to transmit power to a turbine wheel rotating in the same direction as the impeller and mounted on the driven member, and a stationary reaction member.

29. In a hydraulic transmission, simultaneously coacting turbo-ring drives interposed between driving and driven elements, the drives each having a turbine wheel transmitting rotary motion to the driven element, a floating rotor independent of mechanical connection with the driving and driven elements and adapted to turn independently of the driving and driven elements, said rotor having blades actuated by the fluid of one drive and other blades causing fluid movement in another drive or drives whereby it provides a fluid actuated connection between said drives to secure differential transmission of power between the driving and driven elements, the blades of the rotor in the one drive being turbine blades backwardly bent with relation to the direction of rotation of the rotor, and the blades of said rotor in the other drive or drives being impeller blades.

30. A transmission for transmitting power from a driving member differentially to a driven member with varying speed and torque, comprising primary and secondary turbo-ring drives each having a turbine wheel transmitting rotary motion to the driven member, said drives being interconnected by a floating rotor having turbine blades on one portion thereof cooperating with the primary drive to be actuated by the fluid therein and impeller blades thereon cooperating with the secondary drive to cause circulation of the fluid therein, whereby said rotor provides a fluid actuated connection between the drives for differential transmission of power from the driving to the driven member, the turbine blades of the floating rotor being backwardly bent with relation to the direction of rotation of said rotor.

31. A transmission for transmitting power from a driving member differentially to a driven member with varying speed and torque, comprising primary and secondary turbo-ring drives each having a turbine wheel transmitting rotary motion to the driven member, said drives being interconnected by a floating rotor having turbine blades on one portion thereof cooperating with the primary drive to be actuated by the fluid therein and impeller blades thereon cooperating with the secondary drive to cause circulation of the fluid therein, whereby said rotor provides a fluid actuated connection between the drives for differential transmission of power from the driving to the driven member.

32. A transmission for transmitting power from a driving member differentially to a driven member with varying speed and torque, comprising a primary and a secondary drive, the primary drive comprising a differential action hydraulic drive mechanism operable to transmit a portion of the power introduced by the driving member directly to the driven member and having a fluid actuated rotary part for transmitting the balance of the power by means of the secondary drive indirectly to the driven member, the secondary drive comprising an impeller differentially driven by the fluid actuated rotary part of the primary drive to transmit the balance of the power to the driven member, and a turbine wheel turning in the same direction as said impeller and mounted on the driven member in fluid circulating relation with said impeller.

33. A hydraulic transmission comprising, in combination, a three-part vortex ring type drive, one of the three parts constituting an impeller, a driving member operating the same, and two turbine parts in fluid circulating relation with the impeller part, a two-part vortex ring type drive, one part of which constitutes an impeller interconnected with one of the two turbine parts of the first drive for rotation relative to the associated parts of said drives, and a turbine part in fluid circulating relation with the last named impeller part turning with the other turbine part of the first drive, and a driven member arranged to turn with the last mentioned turbine parts.

34. In a differential hydraulic transmission, the combination with driving and driven members, of two Föttinger type fluid couplings and a Föttinger type torque converter, the first coupling having an impeller turned by the driving member, and two turbine wheels in fluid circuit relation therewith one of which transmits drive to the driven member, the second coupling comprising an impeller turned by the other turbine wheel of the first coupling, and two turbine wheels in fluid circuit relation with the impeller one of which transmits drive to the driven member, and the torque converter comprising an impeller driven by the other turbine wheel of the second coupling, and a turbine wheel transmitting drive to the driven member, and a stationary reaction member in fluid circuit relation with the last-named impeller.

HEINRICH SCHNEIDER.

CERTIFICATE OF CORRECTION.

Patent No. 2,212,901. August 27, 1940.

HEINRICH SCHNEIDER.

It is hereby certified that error appears in the printed specification of the above numbered patent requiring correction as follows: Page 4, second column, lines 44 and 45, claim 1, for the words "and a driven element driven by at least one turbine part of each turbo-ring drive" read --and another turbine wheel arranged to turn with the first turbine wheel--; lines 46 and 47, claim 2, for "a first and second turbo-ring drive, each" read --two turbo-ring drives--; lines 54 and 55, same claim, for "by the other turbine parts of the two turbo-ring drives" read --by at least one turbine part of each turbo-ring drive--; lines 56 and 57, claim 3, for "two turbo-ring drives" read --a first and second turbo-ring drive, each--; page 5, first column, line 6, claim 5, for "driving" second occurrence, read --driven--; and second column, line 69, claim 18, for "is" read --in--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.